(12) United States Patent
Sato

(10) Patent No.: US 6,493,299 B2
(45) Date of Patent: Dec. 10, 2002

(54) DUBBING SYSTEM AND DUBBING METHOD

(75) Inventor: Katsuyuki Sato, Chiba (JP)

(73) Assignee: Sony Corporation, Tokyo (JP)

( * ) Notice: Subject to any disclaimer, the term of this patent is extended or adjusted under 35 U.S.C. 154(b) by 150 days.

(21) Appl. No.: 09/730,167

(22) Filed: Dec. 5, 2000

(65) Prior Publication Data

US 2001/0004343 A1 Jun. 21, 2001

(30) Foreign Application Priority Data

Dec. 21, 1999 (JP) .......................................... 11-362520

(51) Int. Cl.[7] ................................................. G11B 5/09
(52) U.S. Cl. ................................ 369/47.12; 369/53.18; 369/84
(58) Field of Search ........................... 369/47.12, 47.13, 369/47.28, 47.32, 53.12, 53.18, 53.42, 83, 84, 85

(56) References Cited

U.S. PATENT DOCUMENTS 4,951,276 A  *  8/1990  Sakaegi et al. .......... 369/53.18
5,897,216 A  *  4/1999  Furuyama .................... 386/52

* cited by examiner

*Primary Examiner*—Paul W. Huber
(74) *Attorney, Agent, or Firm*—Oblon, Spivak, McClelland, Maier & Neustadt, P.C.

(57) ABSTRACT

A dubbing system for inhibiting, for a predetermined length of time, a high-speed dubbing operation for a program for which a high-speed dubbing operation was executed within the predetermined length of time. When the power supply to a volatile memory in which high-speed dubbing permission and inhibition information for each program is stored is reset, the high-speed dubbing immediately after the restarting of the power supply to this volatile memory is forcibly inhibited for the predetermined length of time.

10 Claims, 10 Drawing Sheets

FRAME STRUCTURE

FIG. 6

TOC CONFIGURATION (EXAMPLE OF 6-TRACK DISC)

| TNO | BLOCK NUMBER | POINT | PMIN, PSEC, PFRAME | |
|---|---|---|---|---|
| 00 | n | 01 | 00.02.32 | START POINT OF TRACK #1 |
| | n+1 | 01 | 00.02.32 | |
| | n+2 | 01 | 00.02.32 | |
| | n+3 | 02 | 10.15.12 | START POINT OF TRACK #2 |
| | n+4 | 02 | 10.15.12 | |
| | n+5 | 02 | 10.15.12 | |
| | n+6 | 03 | 16.28.63 | START POINT OF TRACK #3 |
| | n+7 | 03 | 16.28.63 | |
| | n+8 | 03 | 16.28.63 | |
| | n+9 | 04 | . . | |
| | n+10 | 04 | . . | |
| | n+11 | 04 | . . | |
| | n+12 | 05 | . . | |
| | n+13 | 05 | . . | |
| | n+14 | 05 | . . | |
| | n+15 | 06 | 49.10.03 | START POINT OF TRACK #6 |
| | n+16 | 06 | 49.10.03 | |
| | n+17 | 06 | 49.10.03 | |
| | n+18 | A0 | 01.00.00 | TRACK NUMBER OF DISC FIRST TRACK |
| | n+19 | A0 | 01.00.00 | |
| | n+20 | A0 | 01.00.00 | |
| | n+21 | A1 | 06.00.00 | TRACK NUMBER OF DISC LAST TRACK |
| | n+22 | A1 | 06.00.00 | |
| | n+23 | A1 | 06.00.00 | |
| | n+24 | A2 | 52.48.41 | START POINT OF LEAD-OUT TRACK |
| | n+25 | A2 | 52.48.41 | |
| 00 | n+26 | A2 | 52.48.41 | |
| 00 | n+27 | 01 | 00.02.32 | REPEAT |
| | n+28 | 01 | 00.02.32 | |

FIG. 7A CD MODE 1 | CTL | ADR 1 | TNO | INDEX | MIN | SEC | FRAME | 00h | AMIN | ASEC | AFRAME | CRC

Q1~Q4 | Q5~Q8 | Q9~Q80 | Q81~Q95

ELAPSED TIME IN MUSIC | ABSOLUTE TIME

FIG. 7B CD MODE 2 | CTL | ADR 2 | N1 N2 N3 N4 N5 N6 N7 N8 N9 N10 N11 N12 N13 | ZERO | AFRAME | CRC

FIG. 7C CD MODE 3 | CTL | ADR 3 | I1 I2 I3 I4 I5 00 I6 I7 I8 I9 I10 I11 I12 | ZERO | AFRAME | CRC

ISRC (60bit)

FIG. 7D MD | 0 | 0 | TNO | INDEX | ALL "0" S | CRC

FIG. 8

| Character | Binary | Octal |
|---|---|---|
| 0 | 000000 | 00 |
| 1 | 000001 | 01 |
| 2 | 000010 | 02 |
| 3 | 000011 | 03 |
| 4 | 000100 | 04 |
| 5 | 000101 | 05 |
| 6 | 000110 | 06 |
| 7 | 000111 | 07 |
| 8 | 001000 | 10 |
| 9 | 001001 | 11 |
| A | 010001 | 21 |
| B | 010010 | 22 |
| C | 010011 | 23 |
| D | 010100 | 24 |
| E | 010101 | 25 |
| F | 010110 | 26 |
| G | 010111 | 27 |
| H | 011000 | 30 |
| I | 011001 | 31 |
| J | 011010 | 32 |
| K | 011011 | 33 |
| L | 011100 | 34 |
| M | 011101 | 35 |
| N | 011110 | 36 |
| O | 011111 | 37 |
| P | 100000 | 40 |
| Q | 100001 | 41 |
| R | 100010 | 42 |
| S | 100011 | 43 |
| T | 100100 | 44 |
| U | 100101 | 45 |
| V | 100110 | 46 |
| W | 100111 | 47 |
| X | 101000 | 50 |
| Y | 101001 | 51 |
| Z | 101010 | 52 |

DUBBING SYSTEM AND DUBBING METHOD

BACKGROUND OF THE INVENTION

The present invention relates generally to a dubbing apparatus and, more particularly, to a dubbing apparatus having a capability of managing program data to be dubbed for recording, thereby performing copyright protection.

Recently, CD (Compact Disc (trademark)) players for playing back CDs are in common use. Also, such disc media capable of recording/reproducing audio data as an MD (MiniDisc (trademark)) are in widely spread use along with recording/reproducing devices compatible with these disc media. At the same time, audio systems with an MD recorder/player combined with a CD player for example are becoming popular.

In the above-mentioned systems such as MD recorders/players and CD players, audio data are managed in a unit called a "program". The term "program" herein denotes a group of data which is managed and recorded as one unit. For example, with respect to audio data, one unit is equivalent to one piece of music which is also referred to as a "track". Therefore, in what follows, a program may also be referred to as a track.

The above-mentioned audio systems are generally adapted to execute so-called dubbing recording in which audio data reproduced by a CD player are recorded by an MD recorder/player to an MD. There are also systems configured for so-called high-speed dubbing to save the time required for dubbing.

In high-speed dubbing, with a CD player, its disc rotary drive control system and reproduction signal processing system are controlled such that a CD is played back at a predetermined speed higher than a regular, single speed. On the side of an MD recorder/player, its recording signal processing system is controlled so as to provide an operation corresponding to the CD playback speed which is higher than the regular, single speed, thereby capturing the audio data reproduced by the CD player to record the captured audio data to an MD.

In a system with a CD player that serves as a reproducing device and an MD recorder/player that serves as a recording device are integrated for example, it is easy to control the CD player and the MD recorder/player to simultaneously operate at a predetermined higher speed. Even with a system having a discrete reproducing device and a discrete recording device, arrangement of a configuration permitting communication between these devices with a control cable for example can easily realize high-speed dubbing by synchronously controlling the interaction between these devices.

However, the activity of dubbing is generally considered as an activity which should be preferably prevented because it impairs the benefits of copyright holders by duplicating data which are copyrighted work like musical compositions. Moreover, high-speed dubbing denotes the increase in the number of reproductions per unit time as compared with the regular single-speed dubbing. Assume that a user copy only a same track from same CDs or a CD to many MDs in excess of a normal range of personal use and intend to use these MDs for some purpose. If such a user uses the high-speed dubbing capability, these MDs can be produced more efficiently in time than the signal-speed dubbing. Namely, the high-speed dubbing capability promotes copyright violation.

To overcome this problem, HCMS (High-speed Copy Management system) is proposed. HCMS specifies that a track once high-speed dubbed in recording a digital sound source such as a CD to a recording medium such as an MD is inhibited for further dubbing at least for 74 minutes after the start of the dubbing of that track. The dubbing inhibition time of 74 minutes is specified by taking it into account that the maximum value of a total playback time of one CD is nominally 74 minutes. In other words, by inhibiting the high-speed dubbing of one track for a duration of time required for playing back a whole CD, the dubbing efficiency in time for one track is made substantially equal to the dubbing efficiency of single-speed dubbing. Configuring dubbing devices so that high-speed dubbing is limited in accordance with HCMS allows users to dub CDs in a scope in which no copyright violation takes place. It is assumed that, so long as this specification is not violated, the specifications of devices having dubbing capabilities can be determined as desired.

For a high-speed dubbing enabled device or system to restrict the high-speed dubbing in accordance with the HCMS standard, this device or system must have a track control information for identifying a track which has been high-speed dubbed in a predetermined time, 74 minutes for example.

If a certain track is found to be under the control of HCMS, or if it is found high-speed dubbed within 74 minutes before the current point of time on the basis of this track control information, this track is disabled for high-speed dubbing at this point of time. On the contrary, if a certain track is found not under the control of HCMS, or it is found not high-speed dubbed within 74 minutes before the current point of time, this track is enabled for high-speed dubbing.

Actually, if a program to be high-speed dubbed is under the control of HCMS, the dubbing device or system rejects the high-speed dubbing of that program. Otherwise, the dubbing device or system executes the high-speed dubbing of that program. The track thus high-speed dubbed is described in the track control information and disabled for high-speed dubbing for 74 minutes after the start of the last high-speed dubbing. Namely, this track is registered as a new track under the control of HCMS.

For an actual dubbing device or system to execute the track control (namely HCMS control) in accordance with the HCMS standard as described above, the dubbing device or system must have a memory system for storing the track control information.

It is assumed here that, for the above-mentioned memory system for storing the track control information, an area of a RAM of a microcomputer mounted in the dubbing device be assigned for example.

Because this RAM is normally a volatile memory, the information stored in the RAM is all cleared when the dubbing system is reset or the externally power supplied thereto is turned off for example. As a matter of course, the track control information also vanishes.

If, after the information is cleared of the RAM upon a reset operation by user for example, the dubbing device is restarted, the dubbing device cannot execute HCMS control by inheriting the previous track control information.

For example, if, after a certain track was high-speed dubbed, the dubbing device is restarted by resetting the device or turning off the power supply, the high-speed dubbed track can be ready for another high-speed dubbing operation before 74 minutes pass after the start of the last high-speed dubbing. Namely, although the dubbing device has the HCMS control capability, this capability is invalidated by when the device is reset or powered off, easily permitting the high-speed dubbing which is the violation of the HCMS standard.

One method of preventing this problem from happening is to store the track control information in an EEP-ROM (Electrically Erasable and Programmable Read Only Memory) for example which retains the stored information even after the power supply is turned off, rather than in the RAM in the microcomputer.

Another possible method is to arrange an auxiliary power supply system for retaining the track control information in the RAM in the microcomputer. Namely, when the dubbing device is externally reset to powered off, the auxiliary power supply continues supplying the power to the internal RAM which stores the track control information, thereby retaining it for at least 74 minutes.

Constituted as such, the dubbing device can properly continue the high-speed dubbing operation in accordance with the HCMS standard after the device is externally reset or powered off, because the previous track control information is kept stored.

However, the former proposed method must use an EEP-ROM which is currently comparatively costly, thereby raising the cost of the dubbing device. The same holds true with the latter proposed method must separately provide the auxiliary system power supply, which also raises the cost of the dubbing device and increases its circuit scale and power dissipation.

The problem of the increased cost is not negligible for providing low-cost dubbing devices or systems for example.

SUMMARY OF THE INVENTION

It is therefore an object of the present invention to provide, as low-cost as possible, a dubbing apparatus having a capability of restricting high-speed dubbing in accordance with a copyright protection standard such as HCMS, thereby properly restricting the high-speed dubbing even if the dubbing apparatus is externally reset or powered off.

In carrying out the invention and according to one aspect thereof, there is provided a dubbing system for dubbing at least one of programs from a first recording medium in a reproducing unit to a second recording medium in a recording unit, including: operating means for selecting one of high-speed dubbing and regular-speed dubbing that is to be performed on a predetermined program recorded on the first recording medium; clocking means for executing a clocking operation; clock control means for starting the clocking operation by the clocking means when the predetermined program is high-speed dubbed from the first recording medium to the second recording medium; storage means for storing clock information of the clocking means in correspondence to each program recorded on the first recording medium; power supply means for supplying a power at least to the storage means; detecting means for detecting whether the power from the power supply means to the storage means has been interrupted; and control means for controlling, when selecting by the operating means high-speed dubbing of the predetermined program recorded on the first recording means to the second recording means, permission or inhibition of the high-speed dubbing with reference to the clock information stored in the storage means corresponding to the predetermined program recorded on the first recording means, and, when an interruption of the power supply from the power supply means to the storage means is detected by the detecting means and then the power supply to the storage means is restarted, inhibiting the high-speed dubbing of all programs recorded on the first recording means until a predetermined duration of time passes.

According to another aspect thereof, there is provided a dubbing method for storing log information in a memory indicative of whether a high-speed dubbing operation was executed within a predetermined length of time when selecting a high-speed dubbing operation for a program from a first recording medium to a second recording medium inhibiting a next high-speed dubbing operation within a predetermined length of time after the last high-speed dubbing operation, the dubbing method including the steps of: determining whether a power supply to the memory has been interrupted; if, the power supply to the memory is found interrupted, starting a clocking operation; and on the basis of a result of the clocking operation, inhibiting the high-speed dubbing operation for the program recorded on the first recording medium to the second recording medium until the predetermined length of time passes.

BRIEF DESCRIPTION OF THE DRAWINGS

These and other objects of the invention will be seen by reference to the description, taken in connection with the accompanying drawing, in which:

FIG. 4B is a data structure diagram illustrating a Q channel in sub code information recorded on a CD, a playback-only medium;

FIG. 6 is a table illustrating one example of Table Content information recorded in a lead-in area of a CD, a playback-only medium;

FIG. 7A is a data structure diagram illustrating Q channel in the case of mode 1 of a CD, a playback-only medium;

FIG. 7B is a data structure diagram illustrating Q channel in the case of mode 2 of a CD, a playback-only medium;

FIG. 7C is a data structure diagram illustrating Q channel in the case of mode 3 of a CD, a playback-only medium;

FIG. 7D is a data structure diagram illustrating Q channel in an MD, a recordable recording medium;

FIG. 8 is a code table for notation of alphabetical and numerical characters;

DETAILED DESCRIPTION OF PREFERRED EMBODIMENTS

This invention will be described in further detail by way of example with reference to the accompanying drawings.

Used herein for an example of an embodied dubbing apparatus is a recording/reproducing apparatus as a CD-MD composite apparatus that can reproduce CDs and record and reproduce MDs and is configured for so-called dubbing recording in which audio data reproduced from a CD are recorded to an MD. It should be noted here that the following description will be made in the following order:

1. Configuration of the dubbing apparatus;
2. Sub coding and TOC of CD;
3. Example of HCMS control operation in the embodiment (at the time of normal operation); and
4. High-speed dubbing restricting operation in the embodiment (at the time of reset operation).

1. Configuration of the Dubbing Apparatus

Figure 1:
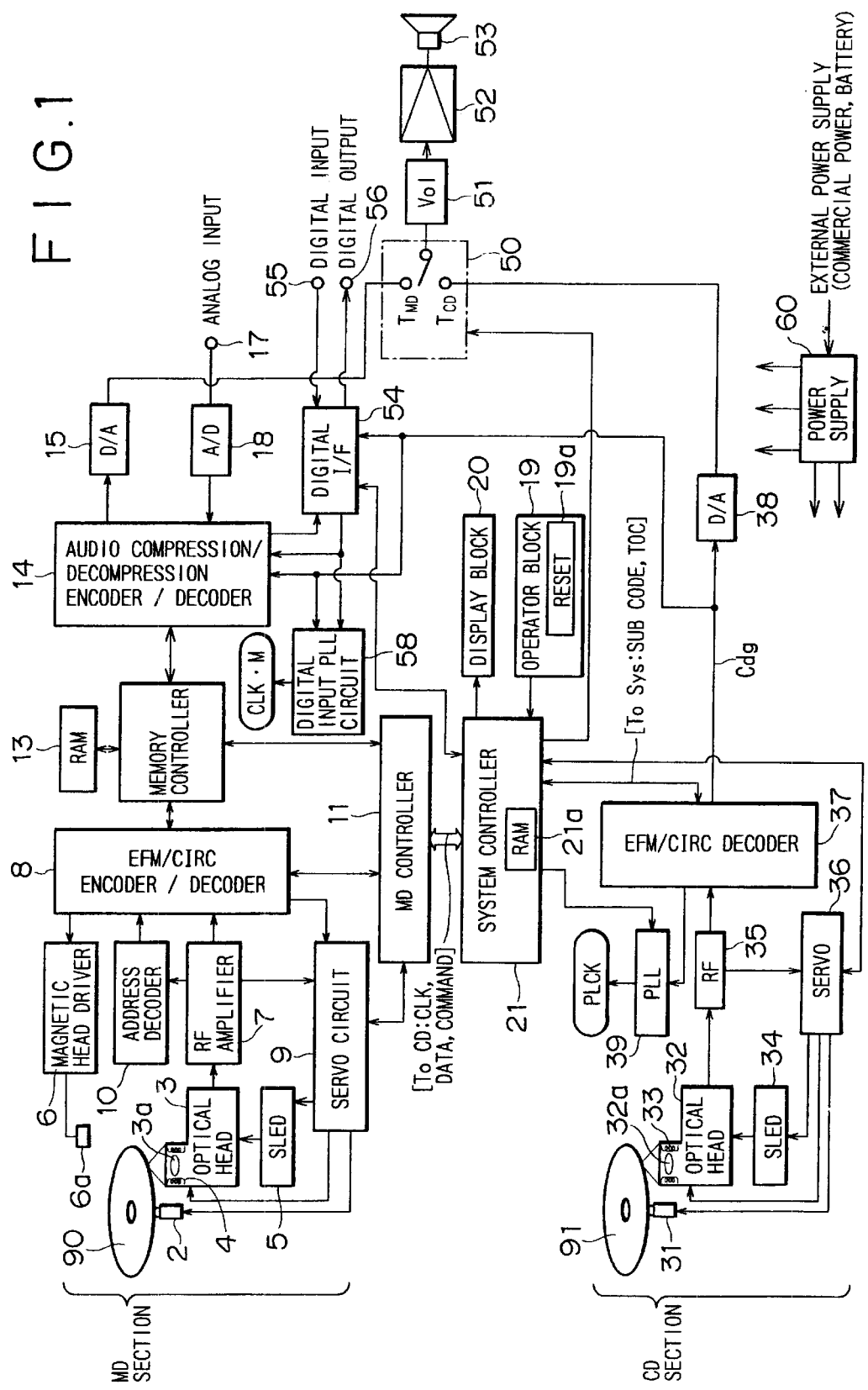
FIG. 1 is a block diagram illustrating a dubbing apparatus practiced as one embodiment of the invention.

Now, referring to FIG. 1, there is shown an example of the internal configuration of the MD-CD composite apparatus as the dubbing apparatus of the present embodiment. In the figure, an MD 90 (an optical disc) is loaded in an MD section for recording or reproducing an MD. The MD 90, used as an audio data recording medium, is rotatively driven by a spindle motor 2 at the time of recording or reproduction. An optical head 3 radiates a laser beam to the MD 90, which is a magneto-optical disc, at the time of recording or reproduction, to perform an operation as a recording/reproducing head. Namely, at the time of recording, the optical head 3 outputs a high-level laser for heating a target recording track to the Curie temperature and, at the time of reproduction, the optical head 3 outputs a comparatively low-level laser to detect data from a return beam on the basis of the Kerr effect.

For this purpose, the optical head 3 has an optical system composed of a laser diode, a polarized beam splitter, and a objective lens 3a, and a detector for detecting reflected lights. The objective lens 3a displaceably held by a double spindle facility 4 in the radial direction of the disc and in a direction away from or approaching the MD 90. The entirety of the optical head 3 is adapted to be moved by a sled facility 5 in the radial direction of the MD 90.

A magnetic head 6a is disposed at a position opposite to the optical head 3 with the MD 90 in between. The magnetic head 6a is movable, along with the optical head 3, by the sled facility 5 in the disc radial direction.

The information detected from the MD 90 by the optical head 3 at the time of reproduction is supplied to an RF amplifier 7. By computationally processing the supplied information, the RF amplifier 7 extracts from this information a reproduction RF signal, a tracking error signal, an focus error signal, and groove information, which is absolute positional information recorded as a wobble shape formed in a groove, which is a recording track on the MD 90. The extracted reproduction RF signal is supplied to an EFM/CIRC encoder/decoder 8.

The tracking error signal and the focus error signal are supplied to a servo circuit 9. The groove information is supplied to an address decoder 10 to be demodulated. The address information decoded from the groove information, the address information recorded as data and decoded by the EFM/CIRC encoder/decoder 8, and the sub coding information are supplied to an MD controller 11 based on a microcomputer for use in controlling various operations.

It should be noted that the MD controller 11 functions as a block for executing various control operations in the MD section.

From the supplied tracking error signal and focus error signal and a track jump command and an access command supplied from the MD controller 11, and the rotational speed detection information of the spindle motor 2, the servo circuit 9 generates various servo drive signals to control the double-spindle facility 4 and the sled facility 5, thereby executing focus and tracking control operations and controlling the spindle motor 2 at constant linear velocity (CLV).

The reproduction RF signal undergoes such decoding processing as EFM (Eight-Fourteen Modulation) decoding and CIRC (Cross-Interleave Reed-Solomon Coding) decoding in the EFM/CIRC encoder/decoder 8. The resultant signal is once stored in a buffer memory 13 by a memory controller 12. It should be noted that the reading of data from the MD 90 by the optical head 3 and the transfer of the reproduction data from the optical head 3 to the buffer memory 13 are executed at a speed of 1.41 Mbits/second and intermittently.

The data written to the buffer memory 13 are read in a timed relation in which the transfer of the reproduction data becomes 0.3 Mbit/second and the read data are then supplied to an audio compression/decompression encoder/decoder 14. The supplied data undergo the reproduction signal processing such as decoding for data compression to be converted into digital audio data by 16-bit quantization and 44.1 KHz sampling. The digital audio data are then converted by a D/A converter 15 into an analog audio signal to be supplied to a terminal TMD of a switching circuit 50.

At the time of reproduction of the MD 90, a system controller 21 for controlling the operations of the entire system connects the switching circuit 50 to the TMD terminal. Therefore, the reproduction audio signal outputted from the audio compression/decompression encoder/decoder 14 and converted by the D/A converter 15 is supplied to a volume adjusting block 51 and a power amplifier 52 via the switching circuit 50 to be sounded from a speaker 53.

Writing to or reading from the buffer memory 13 are executed by addressing by the memory controller 12 by controlling a write pointer and a read pointer. A difference between the bit rates of writing and reading as mentioned above makes a certain amount of data be always kept stored in the buffer memory 13.

Outputting the reproduction audio signal via the buffer memory 13 prevents the reproduction audio output from being interrupted by a out-of-track fault caused by external disturbance for example. Therefore, the reproducing operation can be continued without adversely affecting the reproduction output by restarting the data read operation by accessing a correct tracking position while the data still remain in the buffer memory 13. Namely, this arrangement noticeably enhances the vibration proof of the recording/reproducing apparatus.

The recording/reproducing apparatus also has a digital interface 54. The reproduction data outputted from the audio compression/decompression encoder/decoder 14 at the time of reproduction are also supplied to the digital interface 54. The digital interface 54 encodes a data stream having a predetermined digital interface format by use of the reproduction data and the sub coding information which is extracted at the same time at reproduction and outputs the encoded data stream from a digital terminal 56. For example, this data steam is outputted as an optical digital signal. Namely, the reproduction data can be outputted to an external device as digital data.

At the time of recording to the MD 90, an analog audio signal supplied to an analog input terminal 17 is obtained by 16-bit quantization and 44.1 KHz sampling by an A/D converter 18 into digital audio data. The digital audio data are then supplied to the audio compression/decompression encoder/decoder 14 to be compressed to about $1/5$ in data quantity.

Also, digital audio data captured through the digital interface 54 are recorded to the MD 90. Namely, a digital signal having digital audio interface format supplied from an external device to the digital input terminal 55 is decoded by the digital interface 54. From the decoded digital signal, digital audio data and a sub coding are extracted. At this moment, the control information such as the sub coding is supplied to the system controller 21 and the digital audio data to be recorded are supplied to the audio compression/decompression encoder/decoder 14 to be compressed to about ⅕ in data quantity.

In addition, digital audio data reproduced from a CD 91 by a CD section to be described later are also recorded to the MD 90. This is so-called dubbing recording. In this case, CD reproduction data cdg, which are digital audio data outputted from an EFM/CIRC decoder 37 obtained by 16-bit quantization and 44.1 KHz sampling, are supplied to the audio compression/decompression encoder/decoder 14 to be compressed to about ⅕ in data quantity.

A digital input PLL circuit 58 generates a clock CLK·M synchronized with a synchronization signal inserted in digital audio data inputted via the digital interface 54 or the CD reproduction data cdg inputted from the CD section to be described later. This clock CLK·M has a predetermined frequency which is a multiple of fs=44.1 KHz for example.

Then, the clock CLK·M is divided or multiplied for conversion into a predetermined frequency. At the time of recording data inputted in the MD section as a digital form, the resultant clock is used as a clock for the signal processing to be executed in the audio compression/decompression encoder/decoder 14 and the data transfer for the input/output of thereof.

The recording data compressed by the audio compression/decompression encoder/decoder 14 are once written to the buffer memory 13 by the memory controller 12 and then read in a predetermined timing relation to be supplied to the EFM/CIRC encoder/decoder 8. The recording data undergo the CIRC and EFM encoding processing in the EFM/CIRC encoder/decoder 8 to be supplied to a magnetic head driver 6.

According to the encoded recording data, the magnetic head driver 6 supplies a magnetic head drive signal to a magnetic head 6a. Namely, the magnetic head driver 6 applies N or S magnetic field to the MD 90 through the magnetic head 6a. At the same time, the MD controller 11 supplies a control signal to the optical head so that a high-output laser beam of recording level is radiated to the MD 90.

Recording data to or reproducing data from the MD 90 requires the reading of the control information, namely a P-TOC (Premastered TOC (Table Of Content)) and a U-TOC (User TOC), from the MD 90. According to these pieces of control information, the MD controller 11 determines the address of an area into which the data are to be recorded and the address of an area from which the data are to be reproduced. This control information is stored in the buffer memory 13. Hence, the buffer memory 13 has a buffer area for the recording data and reproduction data and an area for holding this control information.

When the MD 90 is loaded in the recording/reproducing apparatus, the MD controller 11 reads the control information from the MD 90 by reproducing the innermost periphery thereof and stores the read control information in the buffer memory 13 to be referenced later in MD 90 recording/reproducing operations.

The U-TOC is edited and rewritten according to the recording and erasure of data. The MD controller 11 executes this editing on the U-TOC stored in the buffer memory 13 every time a recording or an erasure operation is executed. According to the rewrite operation, the MD controller 11 rewrites the U-TOC area of the MD 90 in a predetermined timed relation.

The present recording/reproducing apparatus also has a reproducing system for reproducing CDs. The CD 91, which is a playback-only optical disc, is loaded in the CD section that executes a CD reproducing operation.

At the time of CD reproduction, the CD 91 is rotated by the spindle motor 31 at a constant linear velocity (CLV). Data recorded on the CD 91 in the form of pits are read by an optical head 32 to be supplied to an RF amplifier 35. In the optical head 32, an objective lens 32a is held by a double-spindle facility 33 to be displaceable in tracking and focusing directions.

Also, the optical head 32 is movable by a sled facility 34 in the radial direction of the CD 91.

In addition to the reproduction RF signal, the RF amplifier 35 generates a focus error signal and a tracking error signal, which are supplied to a servo circuit 36.

From the supplied focus error signal and tracking error signal, the servo circuit 36 generates a focus drive signal, a tracking drive signal, a sled drive signal, and a spindle drive signal to control the double-spindle facility 33, the sled facility 34, and the spindle motor 31.

The reproduction RF signal is supplied to an EFM/CIRC decoder 37. The EFM/CIRC decoder 37 first digitizes the inputted reproduction RF signal to provide an EFM signal. Then, the decoder 37 executes EFM and CIRC on this EFM signal to decode the information read from the CD 91 into digital audio data by 16-bit quantization and 44.1 KHz sampling frequency.

The decoder 37 is also configured to extract control data such as TOCs and sub coding. These TOCs and sub coding are supplied to the system controller 21 to execute various control operations.

The EFM signal obtained by digitizing in the decoder 37 is also supplied to a PLL circuit 39.

The PLL circuit 39 outputs a clock PLCK which is synchronized with a channel bit of the inputted EFM signal. The frequency of this clock PLCK is 4.3218 KHz at the regular, single speed. The clock PLCK is used to drive the signal processor system for example subsequent to the EFM/CIRC decoder 37.

The digital audio data outputted from the EFM/CIRC decoder 37 is converted by a D/A converter 38 into an analog signal to be supplied to the terminal TCD of the switching circuit 50. At the time of CD reproduction, the system controller 21 makes the switching circuit 50 select the terminal TCD. Therefore, the reproduction analog audio signal outputted from the D/A converter 38 is supplied to the volume adjusting block 51 and the power amplifier 52 via the switching circuit 50, being outputted from the speaker 53.

In the present embodiment, the data reproduced from a CD can be dubbed to the MD 90. In this case, the digital audio data outputted from the EFM/CIRC decoder 37 are supplied without change to the audio compression/decompression encoder/decoder 14.

The digital audio data outputted from the EFM/CIRC decoder 37 are supplied to the digital interface 54. Therefore, the CD reproduction data cdg having digital format can be outputted from the digital output terminal 56 to an external device.

At reproduction of the CD 91, the control information, or the TOC, recorded on the CD 91 must be read. According to this control information, the system controller 21 determines the number of tracks recorded on this CD 91 and the addresses of these tracks, thereby executing CD reproduction control. For this purpose, the system controller 21 executes the reproduction of the innermost periphery of the CD in which the TOC is recorded when the CD 91 is loaded and stores the read TOC information in an internal RAM 21a for example for the reference by a later reproducing operation to be executed on the CD 91.

The system controller 21, which is a microcomputer for controlling the recording/reproducing apparatus in its entirety, gives various commands to the MD controller 11 so as to make it execute control operations over the MD section. At reproduction of the MD 90, the system controller 21 receives the control information such as sub coding from the MD controller 11.

The CD section is directly controlled by the system controller 21.

The internal RAM 21a of the system controller 21 is adapted to temporarily store various items of information which are necessary for the system controller 21 to execute predetermined processing.

In the present embodiment, the system controller 21 outputs a clock CLK obtained in the CD section (for example, the clock having a predetermined frequency obtained on the basis of the PLCK), various data, and command commands for controlling the MD controller 11 according to reproducing operations executed in the CD section for example. These various data include the TOC and sub coding obtained at CD reproduction.

The system controller 21 of the present embodiment has a capability of executing HCMS management. The configuration of the system controller 21 for supporting this capability will be described later. The HCMS management referred to herein denotes various information management operations and operational control for realizing the dubbing restricting operation according to the HCMS standard, which will be described later.

It should be noted that the above-mentioned control system is for the illustrative purpose only. Alternatively, a CD controller for controlling the CD side may be arranged for example. Alternatively still, a configuration may be arranged in which the system controller 21 and the MD controller 11 are integrated into one controller.

The operator block 19 is arranged with a record key, a playback key, a stop key, an AMS key, a search key, a dubbing key which allows the setting of single-speed dubbing and high-speed dubbing, thereby allowing the user to reproduce and record the MD 90 and the CD 91.

The operator block 19 also allows the user to input character strings of accompanying data such as track names, execute registration, and select registered modes.

The operation information inputted from the operator block 19 is supplied to the system controller 21. On the basis of this information and an operating program, the system controller 21 makes components of the present apparatus execute their predetermined operations.

In addition, the operator block 19 of the present embodiment has a reset switch 19a for initializing the state of the system operating as a dubbing device shown in FIG. 1 for example to that before the occurrence of an error.

Although not shown, the operator block 19 may be equipped with a remote control capability based on an infrared remote commander.

A display block 20 displays predetermined information at the time of recording and reproduction of the MD 90 and the CD 91. For example, under the control of the system controller 21, such items of information as time-associated information including a total playback time and recording and reproduction progressive times, a track number, an operating state, and an operating mode are displayed.

A power supply block 60 generates a DC voltage of a predetermined level from an externally supplied commercial power and supplies the generated power to the functional components of the dubbing device shown in FIG. 1. If the present dubbing device is configured to operate on a battery as an external power supply, a DC voltage supplied by this battery can be outputted to the functional components of the dubbing device. It should be noted that, instead of using the commercial power as an external power supply, the dubbing device can use a supply voltage obtained by converting the commercial power into a DC power by use of a power adapter.

The recording/reproducing apparatus having the above-mentioned configuration and practiced as one embodiment of the invention can perform an MD reproducing operation, an MD recording operation, a CD reproducing operation, and a dubbing operation in which data are copied from a CD to an MD.

Especially, in the present embodiment, while a dubbing operation from CD to MD may be executed with a regular single-speed operation, a high-speed dubbing operation (N times as fast ($N \geq 2$)) which is faster than the regular single-speed may be executed as follows.

First, the servo circuit 36 of CD section sets the spindle motor 31 to an N-time CLV as compared with the regular single speed and drives the spindle motor 31 at this speed. In this state, data are reproduced from the CD 91. Next, the PLL circuit 39 sets $2 \times 4.3218 = 8.6436$ MHz (a clock frequency two times as high as that of regular single speed) for example as a target value for locking the spindle motor operation at an N-time speed. Switching between target values for the PLL circuit 39 is executed by the system controller 21.

Consequently, when the PLL circuit 39 is locking, the rotation of the CD 91 is controlled with stability at N-time CLV and, at the same time, the EFM/CIRC decoder 37 and the D/A converter 38 execute normal signal processing at N-time speed.

The processing at N-time speed transfers the CD reproduction data cdg (sampling frequency $=88.2$ KHz $(=44.1 \times 2)$ and the number of quantization bits $=16$) having a transfer rate which is N times as high as the regular single speed to the audio compression/decompression encoder/decoder 14 of the MD section.

The CD reproduction data cdg transferred at an N-time transfer rate are also inputted in the digital input PLL circuit 58. The digital PLL circuit 58 sets a target value so that locking is made at a channel clock frequency N-time as high as the regular speed. The switching between target values is controlled by the MD controller 11 in accordance with a command given by the system controller 21 for example.

Consequently, when the digital input PLL circuit 58 is locking, a frequency which is N times as high as the regular speed is obtained as the clock CLK·M. With this clock CLK·M, the audio compression/decompression encoder/decoder 14 executes signal compression processing, the data transfer to the memory controller 12, and the data writing to the buffer memory 13, thereby executing recording signal processing in synchronization with the CD reproduction data cdg supplied from the CD section at an N-time transfer rate.

The timing of reading the data stored in the buffer memory 13 into the EFM/CIRC encoder/decoder 8, the timing of the signal processing by the EFM/CIRC encoder/ decoder 8 and recording, and the timing of supplying recording the data to the MD 90 are provided by appropriately using a master clock supplied from the MD controller 11 or a clock obtained at the rotation control by use of a wobble frequency formed on the MD.

As described, in the MD section, the recording to the MD 90 is made intermittently because the speed of read data from the buffer memory 13 is set higher than the speed of writing to it. Namely, when data are stored in the buffer memory 13 in excess of a predetermined level, the data are written to the MD 90. When this data writing lowers the level of the storage of data in the buffer memory 13 below a predetermined level or to zero level, data are kept stored in the buffer memory 13 to the level at which the writing becomes ready. These operations are repeated.

Consequently, the rotational drive speed of the MD 90 at an N-time speed dubbing operation and the input/output data transfer rate and signal processing speed of the EFM/CIRC encoder/decoder 8 need not always be set to a speed corresponding to the N-time reproduction speed of the CD section.

Namely, if the MD 90 is driven with the single speed and the data input/output rate and signal processing speed of the EFM/CIRC encoder/decoder 8 are also set to the single speed, the data recording to the MD 90 is properly executed by making shorter a period in which writing to the MD 90 is paused than the regular single speed or by executing a continuous recording operation without intermittent recording.

However, depending on the conditions such as the storage size of the buffer memory 13 for example, the rotational drive speed of the MD 90 and the input/output data transfer rate and signal processing speed of the EFM/CIRC encoder/decoder may be set to a certain predetermined N-time speed.

Figure 2:
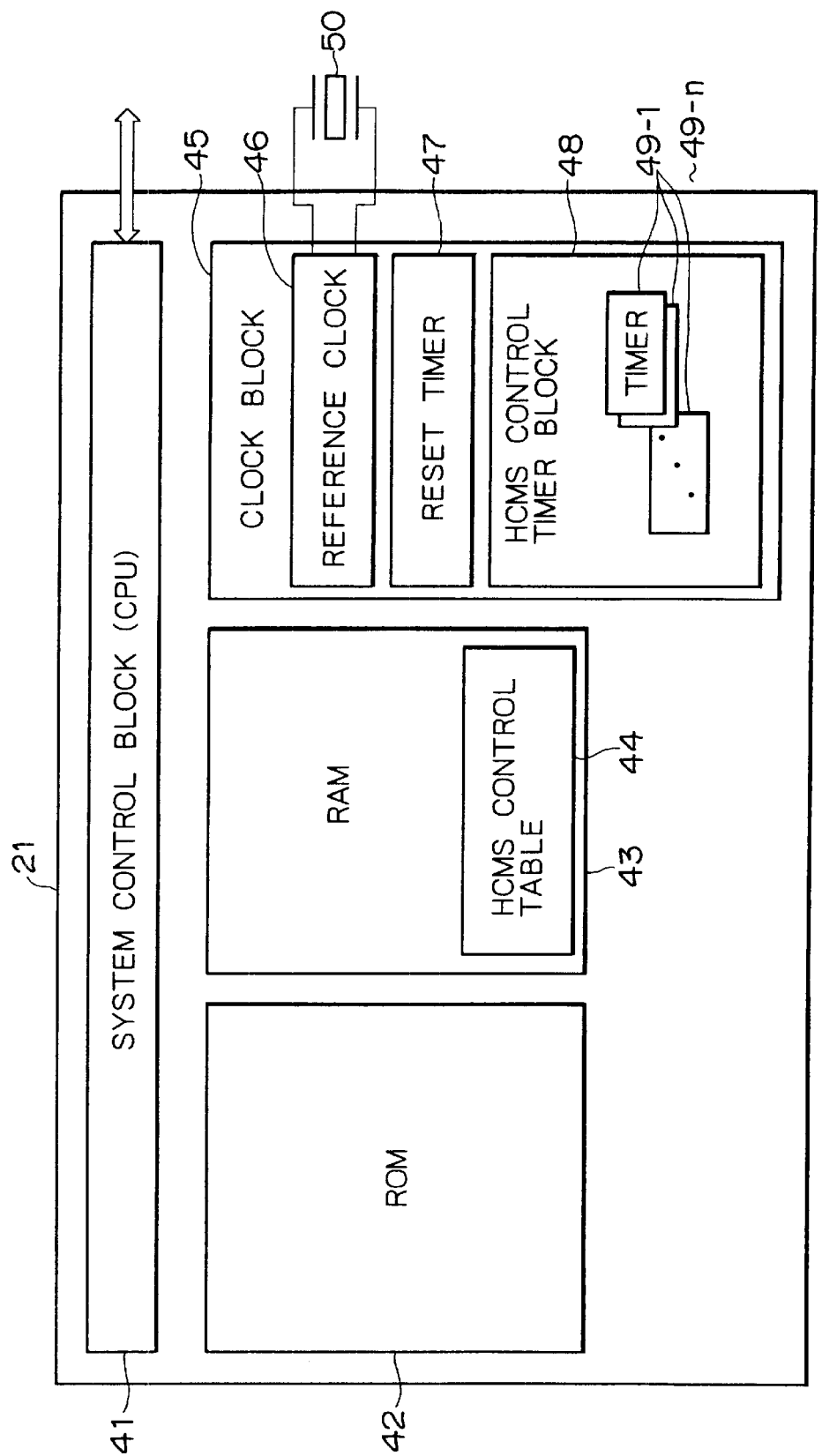
FIG. 2 is a block diagram illustrating details of a system controller 21 shown in FIG. 1.

FIG. 2 shows a configuration of the system controller 21 corresponding to the HCMS management function.

The system controller 21 as shown in FIG. 2 comprises a system control block 41, a ROM 42, a RAM 43, and a clock block 45.

The system control block 41 is constituted by a CPU (Central Processing Unit) for example and executes various control operations on the functional components shown in FIG. 1 for example as instructed by a program stored in the ROM 42.

The ROM 42 stores the program by which the system control block 41 executes control operations as described above and factory preset data such as parameters necessary for the execution of various processing operations.

The RAM 43 temporarily stores information such as computation results generated by the system control block 41 at the execution of various processing operations.

The contents of the RAM 43 are cleared when the supply of the external power (including the battery) to the dubbing device is interrupted, stopping the operation of the dubbing device itself. When the dubbing device is powered on again, the system controller 21 starts operations from the initial state.

The contents of the RAM 43 are also cleared by a reset operation executed in accordance with the operation performed on the reset switch 19a.

In the present embodiment, an area for an HCMS control table 44 is allocated in the RAM 43. This HCMS control table 44 is used for the HCMS management at normal operation along with an HCMS control timer block 48 to be described later. Namely, the system controller 21 of the present embodiment has a capability of restricting the high-speed dubbing operation in accordance with the HCMS standard. The HCMS control operation embodied by use of the HCMS control table 44 and the HCMS control timer 48 will be described later.

The clock block 45 has a capability of clocking the system controller 21 and comprises a reference clock 46, a reset timer 47, and the HCMS control timer block 48. Actually, this clock block is realized in a software approach.

The reference clock 46 clocks the current time on the basis of the output of a crystal resonator 50 for example. It should be noted that the crystal resonator 50 is driven by an internal buttery, not shown, so that the operation of the crystal resonator 50 does not stop if the supply of the external power to the dubbing device is discontinued. Namely, the reference clock 46 clocks the current time if the external power supply is stopped.

The reset timer 47 realizes the high-speed dubbing restricting operation of the present embodiment at the time of reset start. The high-speed dubbing operation which is executed at reset start will be described later.

The HCMS control timer 48 has a plurality of timers 49-1 through 49-n and is used for executing the HCMS control at the time of normal operation.

2. Sub Coding and TOC of CD

The following describes a TOC and sub coding recorded on the CD 91. The TOC is recorded in the so-called lead-in area of the CD 91 and the sub coding is inserted in data as will be described.

A minimum unit in which data are recorded on a CD is one frame. One block is made up of 98 frames.

Figure 3:
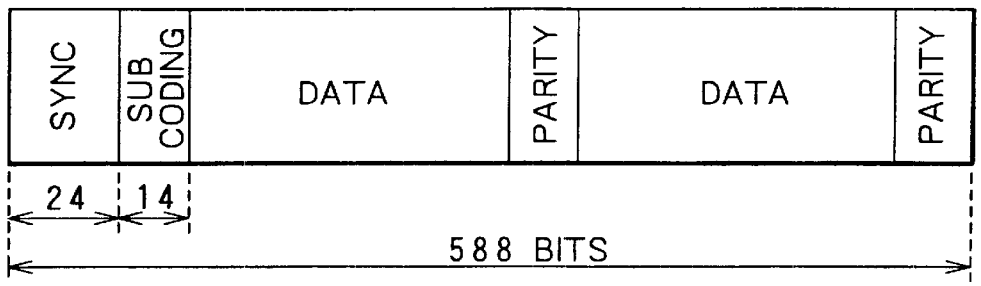
FIG. 3 is a data structure diagram illustrating a frame structure of a CD, a playback-only medium.

Each frame has a structure as shown in FIG. 3. One frame consists of 588 bits. The first 24 bits provide synchronization data and the following 14 bits provide a sub coding area, followed by data and parities.

The 98 frames each having the above-mentioned structure form one block. Sub coding data collected from the 98 frames form one block of sub coding data as shown in FIG. 4B.

The sub coding data taken from the first and second frames (frame 98$n$+1 and frame 98$n$+2) of the 98 frames provide a sync pattern. The third frame through the 98th frame (frame 98$n$+3 through frame 98$n$+98) provide 96-bit channel data, namely sub coding data P, Q, R, S, T, U, V, and W.

Of these sub coding data, P channel and Q channel are used for controlling access and so on. However, P channel indicates only a pause between tracks, more detail control operations being executed by Q channel (Q1 through Q96). Q channel data consisting of 96 bits are configured as shown in FIG. 4B.

Four bits of Q1 through Q4 are control data for use in indication of the number of channels of audio, pre-emphasis presence, CD-ROM identification, and digital copy enable/disable distinction.

Four bits of Q5 through Q8 represent an address indicative of the content of sub Q data control bits.

Q9 through Q80, 72 bits in total, provide sub Q data, remaining Q81 through Q96 being a CRC (Cyclic Redundancy Check) data.

In the lead-in area, the sub Q data recorded therein provides TOC information.

Figure 5A:
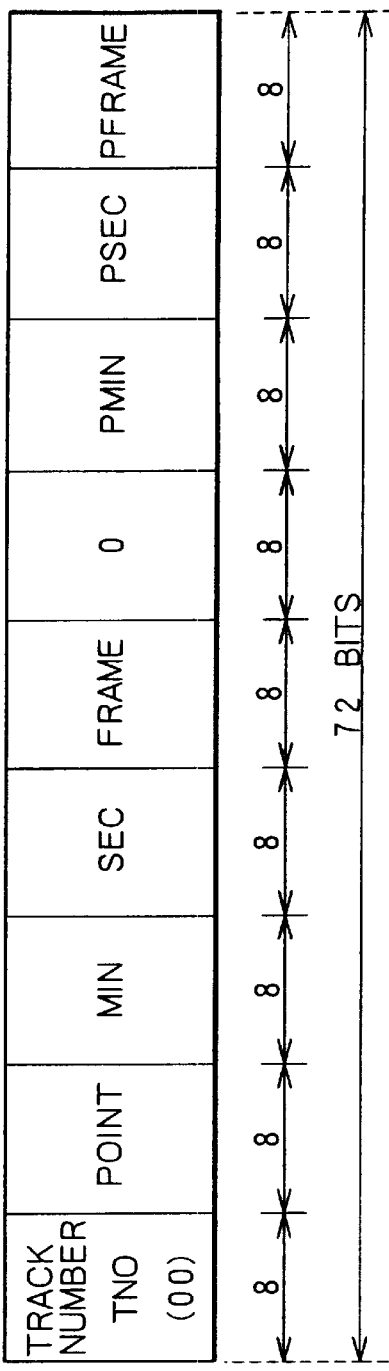
FIG. 5A is a data structure diagram illustrating an example in which data of Q channel shown in FIG. 4B are recorded in a lead-in area.

Namely, the sub Q data of 72 bits Q9 through Q80 in the Q channel data read from the lead-in area have information as shown in FIG. 5A. The sub Q data are divided into the times of data as shown each being 8 bits wide.

The first item of these data is a track number (TNO). In the lead-in area, the track number is fixed to "00".

Next, a point (POINT) is recorded, followed by minute (MIN), second (SEC), and a frame number (FRAME).

Subsequently, PMIN, PSEC, and PFRAME are recorded, of which meanings are determined by the value of POINT.

If the value of POINT is "01" to "99", that value indicates a track number. In this case, in PMIN, PSEC, and PFRAME, the start point (an absolute address) of this track number is recorded as minute (PMIN), second (PSEC), and frame number (PFRAME).

When the value of POINT is "A0", the first track number is written to PMIN. The value of PSEC identifies CD-DA (digital audio), CD-I, CD-ROM (XA specification) and so on.

When the value of POINT is "A1", the last track number is written to PMIN.

When the value of POINT is "A2", the start point of the lead-out area is indicated in PMIN, PSEC, and PFRAME as an absolute time address.

With a disc recorded with 6 tracks for example, data are recorded as shown in FIG. 6 for a TOC based on these sub Q data.

As shown in FIG. 6, the track numbers TNO are all "00".

Block number indicates the number of one unit of sub Q data read as block data based on the 98 frames mentioned above.

Each piece of TOC data has same contents over three blocks. As shown, if POINT is "01" to "06", the start points of the first track #1 through the sixth track #6 are indicated as PMIN, PSEC, and PFRAME.

If POINT is "A0", "01" is written to PMIN as the first track number. The PSEC value identifies a disc; "00" for an ordinary audio CD. If the disc is a CD-ROM (XA specification), PSEC="20" and if the disc is a CD-I, PSEC="10".

The POINT value is recorded at position "A1" and the track number of the last track is recorded in PMIN. The POINT value is indicated at position "A2" and the start point of the lead-out area is indicated in PMIN, PSEC, and PFRAME.

Subsequent to block n+27, contents of blocks n through n+26 are repeatedly recorded.

Figure 5B:
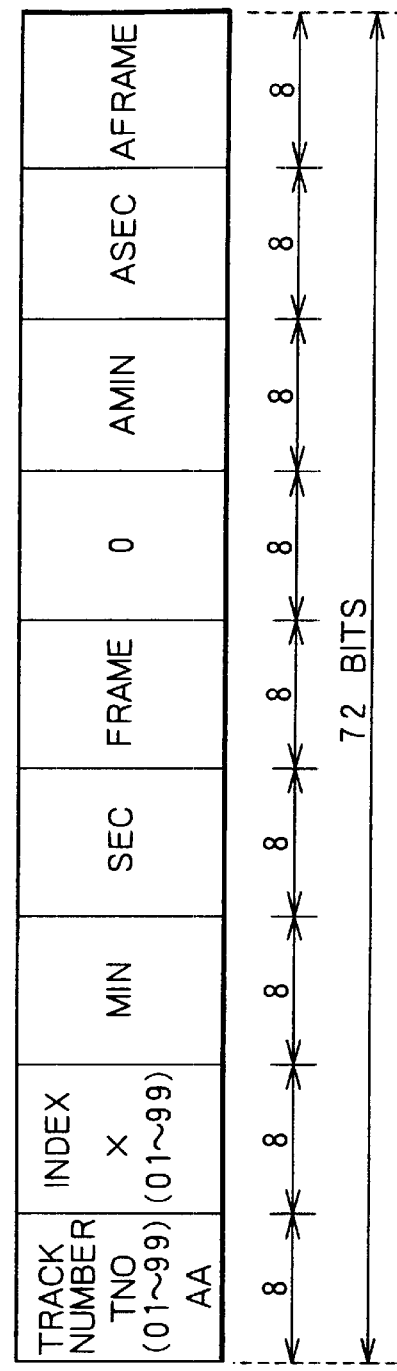
FIG. 5B is a data structure diagram illustrating an example in which data of the Q channel shown in FIG. 4B are recorded in a track area and a lead-out area.

The sub Q data recorded in the program area in which music data are recorded as tracks #1 through #n and the lead-out area have the information shown in FIG. 5B.

First, a track number is recorded. Namely, tracks #1 through #n have values "01" through "99" respectively. In the lead-out area, the track number is "AA".

Next, the information is recorded as an index for breaking each track into detail parts.

Subsequently, MIN (minute), SEC (second), and PFRAME (frame number) are recorded as a passed time in the track.

These data are followed by an absolute address in AMIN (minute), ASEC (second), and AFRAME (frame number).

The Q channel data as a CD are divided into mode 1, mode 2, and mode 3 as known, each mode having different contents.

First, mode 1 shown in FIG. 7A as the Q channel data of a CD will be described below.

In FIG. 7A, first 4 bits Q1 through Q4 provide control data CTL for use in indication of the number of audio channels and pre-emphasis presence and CD-ROM identification.

Namely, the 4-bit control data are defined as follows:

"0***". . . 2-channel audio data

"1***". . . 4-channel audio data

"*0**". . . CD-DA (CD digital audio)

"*1**". . . CD-ROM

"**0*". . . digital copy disabled

"**1*". . . digital copy enabled

"***0". . . pre-emphasis not provided

"***1". . . pre-emphasis provided

A predetermined value is set to the control data CTL in accordance with the contents actually set to that CD. This holds true with the control data CTL (Q1 through Q4) in the Q channel data of mode 2 and mode 3 to be described later.

The 4 bits Q5 through Q8 provide address (ADR) for controlling the data of Q9 through Q80.

If these 4 address bits are "0001" ("1" in decimal notation), the following sub Q data Q9 through Q80 indicate the Q data of an audio CD as mode 1.

Q9 through Q80 provide 72-bit sub Q data and the remaining Q81 through Q96 provide a CRC.

The 72 bits of Q9 through Q80 as sub coding contents store the information shown in FIG. 7A. First, a track number (TNO) is recorded. Namely, tracks #1 through #n have "01" through "99". In the lead-out area, the track number is "AA".

Next, the information is recorded as an index (INDEX) for breaking each track into detail parts.

Subsequently, MIN (minute), SEC (second), and FRAME (frame number) are recorded as an elapsed time in the track.

These data are followed by an absolute time address in AMIN (minute), ASEC (second), and AFRAME (frame number). The absolute time address is time information in which the start point of the first track is a 0-minute 0-secondframe, followed by continuous addresses up to the lead-out area. Namely, the absolute time address provides the absolute address information for controlling the tracks on the disk.

FIG. 7B shows a structure of the Q channel data of mode 2. The address ADR (Q5 through Q8) in the Q channel data of mode 2 is "0010" ("02" in decimal notation) in this case. The following sub Q data Q9 through Q80 are the contents of the Q data of an audio CD as mode 2.

The sub Q data Q9 through Q80 as mode 2 store data N1 through N13 of 13 digits (4×13=52 bits). The data N1 through N13 are followed by "0" bit interval, an absolute time frame number (AFRAME) and a CRC.

The data N1 through N13 are identification information for identifying the product number of that CD and are used for so-called bar coding.

FIG. 7C shows a structure of the Q channel data as mode 3. The Q channel data as mode 3 may be inserted in continuous 100 sub coding blocks once or less as CD standard.

Address ADR (Q5 through Q8) in the Q channel data of mode 3 is "0011" ("3" in decimal notation) in this case. The subsequent sub Q data of Q9 through Q80 indicate the contents of the Q data of an audio CD as mode 3.

The area of the sub Q data of Q9 through Q80 as mode 3 stores an ISRC (International Standard Recording Code) consisting of 60 bits I1 through I12.

This ISRC is information for giving a unique number (an identifier) to a track as one piece of music. For example, ISRC is an international standard code for identifying each track recorded on a CD in copyright control.

ISRC is followed by a "0" bit interval, followed by an absolute time frame number (AFRAME) and a CRC.

Of the data I1 through I12 forming the above-mentioned ISRC, I1 through I5 each consist of 6 bits, to which characters correspond as shown in FIG. 8 in a format. I6 through I12 each consist of 4 bits, which are represented by BCD. A 2-bit "0" interval is inserted between I1 through I5 and I6 through I12.

The 12 bits of I1 through I2 represent a country code which identifies a country name by 2 characters represented by the definition shown in FIG. 8.

The 18 bits of I3 through I5 represent a owner code which can identifying 24,480 owners by 2 characters and 2 numerals represented by the definition shown in FIG. 8.

The 8 bit of I6 and I7 represent a year of record by representing numerals of I6 and I7 each 4 bits wide by BCD.

The 20 bits of I8 through I12 represent the serial number of the recording by representing numerals by I8 through I12 being each 4 bit wide by BCD.

ISRC consisting of the above-mentioned pieces of information is inserted as sub coding having a value unique to each track, thereby identifying each track.

For supplementary description, a structure of the Q channel data of a MiniDisc is as shown in FIG. 7D.

In the case of a MiniDisc, track number (TNO), index information (INDEX), and CRC code are arranged but no time information is provided.

The areas corresponding to control data CTL (Q1 through Q4) and address ADR (Q5 through Q8) each store "0000".

3. Example of HCMS Control Operation in the Embodiment (at the Time of Normal Operation)

As seen from the above description, in the present embodiment, high-speed dubbing by a predetermined N-time speed can be executed. As described with the related-art example, if the user frequently executes high-speed dubbing on a same CD or track, it may go beyond a normal personal use range, thereby violating the copyright of the copied CD or track.

For the copyright protection, the dubbing device of the present embodiment is configured to restrict the high-speed dubbing on a track basis in accordance with the HCMS standard; namely, this dubbing device is configured to execute HCMS control.

For confirmation, HCMS specifies that a track as a piece of music which has once undergone a high-speed dubbing operation is prevented from being subjected to another high-speed dubbing operation at least for 74 minutes after the start of the last high-speed dubbing of that track The following describes an example of an HCMS control operation in the present embodiment.

It should be noted that, in the present embodiment, an HCMS control operation to be described below is assumed to be an operation executed in a state in which the present dubbing device is normally operating. Therefore, this HCMS control operation in normal operating state is not applied to the high-speed dubbing restricting operation corresponding to a reset operation.

Figure 9:
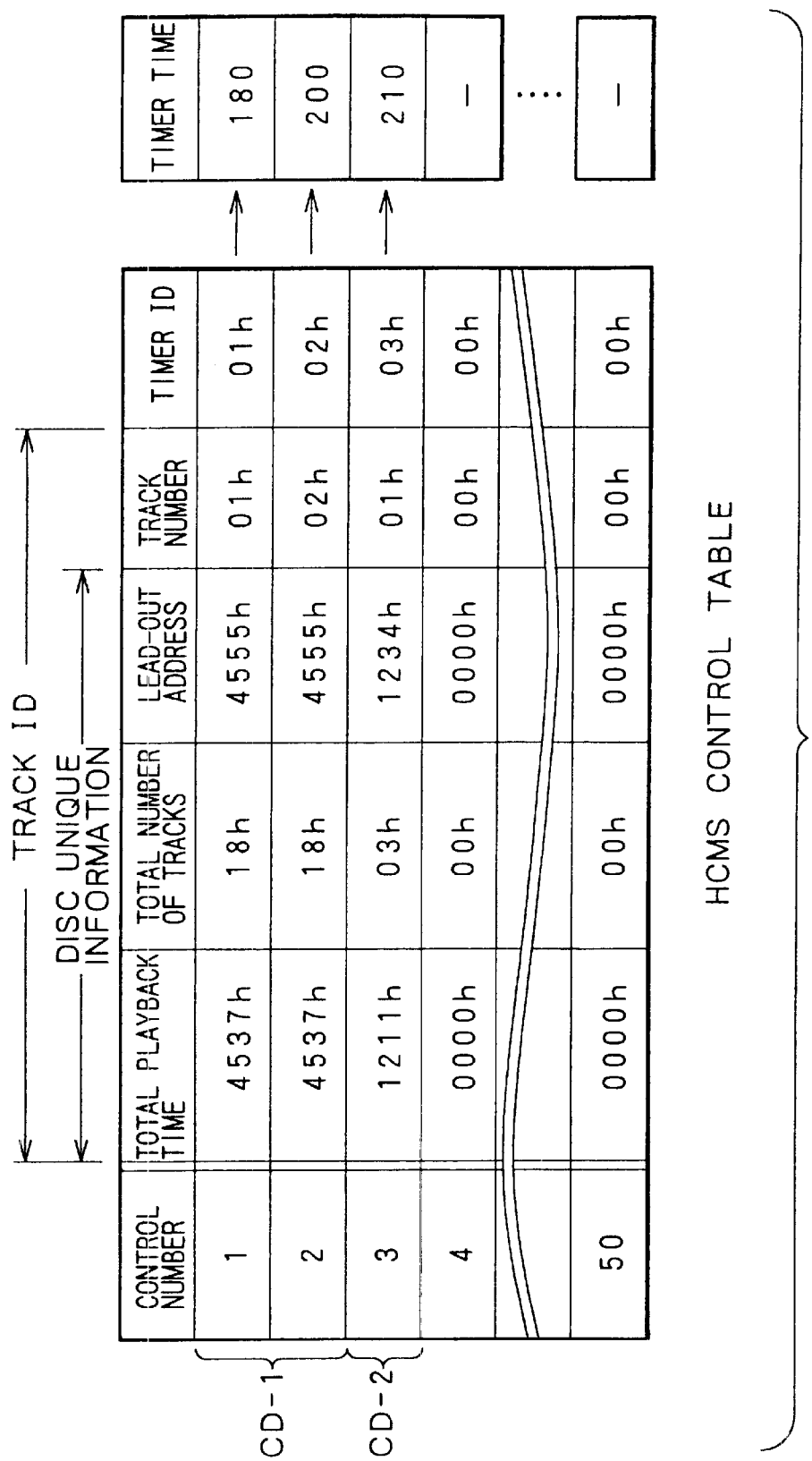
FIG. 9 is an HCMS control table stored in a memory.

FIG. 9 shows an example of a data mapping structure of the HCMS control table 44. In the HCMS control table 44 shown in FIG. 9, areas corresponding to control numbers 1 through 50 are arranged. These control numbers correspond to the number of tracks that can be controlled by HCMS. Therefore, in this case, a maximum of 50 tracks can be controlled with respect to HCMS.

The area corresponding to each control number is largely classified into a track ID and a timer ID. The track ID is formed by a disk unique information area and a track number area. The disk unique information area is formed by areas of total play time, total number of tracks, and lead-out address.

The three items of information as disk unique information, namely total play time, total number of tracks, and lead-out address, may be obtained on the basis of the TOC of the CD on which the track concerned is recorded.

Figure 4A:
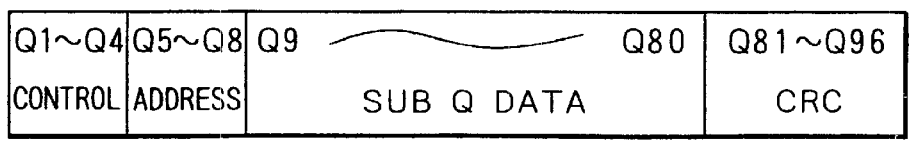
FIG. 4A is a data structure diagram illustrating a block structure of a CD, a playback-only medium.

To be more specific, as described with referenced to FIGS. 4A and 5, the TOC of the CD indicates the start point of each track recorded on that CD in minute, second, and the number of frames and the start point of the lead-out of the CD also in minute, second, and the number of frames. Therefore, on the basis of these pieces of information, the three items of information, namely total play time, total number of tracks, and lead-out address, can be obtained. The total play time can be obtained by totaling the play time of the tracks for example. The total number of tracks can be obtained by referencing the track number of the last track indicated by POINT=A1. The lead-out address can be obtained by referencing the start point of the lead-out track indicated by POINT=A2.

Totally, these items of information, total play time, total number of tracks, and lead-out address, can be viewed as the information unique to each CD. Namely, these three items of information can be handled as disc unique information. Combining this disk unique information with the track numbers in the CD identified by this information allows the user to obtain track ID information for identifying each track.

In this case, the total play time is represented by 2 bytes, the total number of tracks by 1 byte, the lead-out address by 2 bytes, and the track number by 1 byte. Thus a total of 6 bytes represent each track ID.

The timer ID is imparted to each of the plurality of timers (49-1 through 49-n) prepared in the HCMS control timer block 48 (hereafter simply referred to as the timer block 48). Of the timers (49-1 through 49-n) prepared in the timer block 48, a timer ID area shown in FIG. 9 stores one timer ID of a timer used for HCMS control as will be described later.

In this case, the number of timers n in the timer block 48 may be 50 for example because the maximum number of controllable tracks (the maximum number of control numbers) is 50. In response, up to 50 numbers may be represented also in the timer ID area in the HCMS control table 44. Therefore, the timer ID is represented by 2 bytes and the values in a range of 01h (=1) through 32h (=50) are used.

It is assumed here that high-speed dubbing has been executed on two tracks of Tr1 and Tr2 among the tracks recorded on a certain CD beginning from a state in which there is no track registered in the HCMS control table. For convenience, this CD is CD-1, then tracks Tr1 and Tr2 high-speed dubbed from this CD-1 are registered in the HCMS control table 44 as shown in FIG. 9.

It is assumed again that, on the basis of the TOC information read from the CD-1 and stored in the RAM 21a, the total play time of this CD-1 be 45 minutes 37 seconds, its total number of tracks be 18, and its lead-out address be at a position of 45 minutes 55 seconds.

In this case, for example, the system controller 21 stores 4537h (=45 minutes 37 seconds) into the area of total play time, 18h (=18 tracks) into the area of total number of tracks, and 4555h (=45 minutes 55 seconds) into the area of lead-out address indicated by control number 1 as shown in FIG. 9 when high-speed dubbing of the track Tr1 of the CD-1 starts. Next, the system controller 21 stores 01h indicative of the number 1 of this track into the area of track number. Namely, the ID of the track with which high-speed dubbing has started now is registered in the HCMS control table 44.

In this example, the numeral expression of the total play time and the lead-out address is omitted for the number of frames. Actually, however, the numerical expression in these two areas may be made including the number of frames.

When a new track ID has been stored in the HCMS control table 44 as described above, one timer not used in the timer block 48 is selected in correspondence with the newly stored track ID and the selected timer is started. Each timer in the timer block 48 is set to a timer time of 74 minutes. In this case, once the timer is started, the timer is counted down from 74 minute for example. Conversely, the timer may also be counted up from 0 minute to 74 minutes.

Then, the timer ID assigned to the timer thus started is stored in the timer ID area indicated by the same control number as the newly registered track ID.

In this case, it is assumed that the timer assigned with timer ID=01h in correspondence with the start of high-speed dubbing of the track Tr1 of the CD-1 has been started. Therefore, 01h is stored in the timer ID area indicated by control number 1 shown in FIG. 9.

It is also assumed that high-speed dubbing of the track Tr2 of the CD-1 has started upon the end of the high-speed dubbing of the track Tr1.

Then, the track Tr2 of the CD-1 is registered in the area indicated by control number 2 shown in FIG. 9. Namely, the track ID of the track Tr2 of the CD-1 is registered in the area indicated by control number 2 and, at the same time, a timer assigned with ID=02h is selected from among the timers (49-1 through 49-n) in the timer block 48 and the selected timer is started, the timer ID=02h being stored in the timer ID area.

In the case shown in FIG. 9, it is assumed that a track Tr1 of a CD-2, which is different from the CD-1, is high-speed dubbed next.

For this purpose, the track TR1 of the CD-2 is registered in the area indicated by control number 3 shown in FIG. 9. Namely, the disk unique information (total play time=1211h, total number of tracks =03h, and lead-out address=1234h) of the CD-2 and the track ID consisting of track number=01h are stored in the area indicated by control number 3. At the same time, the value of timer ID=03h assigned to the timer activated at the start of high-speed dubbing of the track Tr1 of this CD-2 is stored in this area.

In the above example, the registration into the HCMS control table 44 has been made for the three high-speed dubbed tracks. The timer started for each of these three registered tracks is actually counted down in the timer block 48 after the start of the high-speed dubbing. For example, the timer times at a certain point of time of the timers having IDs=01h, 02h, and 03h are shown in FIG. 9.

If it is necessary to reference the timer time of a timer started for a track registered in the HCMS control table 44, the system controller 21 references the timer time of the timer indicated by the timer ID registered along with the track ID of the track concerned in the HCMS control table 44. To be more specific, to reference the current timer time of the track Tr1 of the CD-1, the system controller 21 references the timer time of the timer indicated by the timer ID in the area indicated by control number 1 in which the track ID of the track Tr1 of the CD-1 is stored.

For the timer time of each timer set in the timer block 48, 74 minutes may only be counted. In terms of accuracy, if the time is decremented (counted down) on a 20-second basis, it is expressed as follows:

$$74\times 60/20=222<255$$

Consequently, the timer time can be fully expressed by one byte.

When the timer corresponding to the track ID stored in the HCMS control table 44 has lapsed 74 minutes and reached 0, the information of the track ID and the information of the corresponding timer ID are cleared, being deleted from the HCMS control table 44.

Referring to FIG. 9, of the areas controlled by control numbers 1 through 50, the areas having control numbers 4 and on are unused. For these unused areas, zeros are stored. Namely, 0000h is stored in the area of total play time, 00h is stored in the area of total number of tracks, 0000h is stored in the area of lead-out address, and 00h is stored in the area of track number. For the timer ID, 00h is stored, thereby indicating that the timer is not used.

In the present embodiment, the HCMS control table is thus formed. It should be noted that the numerical representation in each area is for illustrative only and therefore it is not limited to this example.

For example, in the current situation in which tracks are registered in the HCMS control table 44 as shown in FIG. 9 and the timers corresponding to these tracks are counting times, control (HCMS control) for restricting the high-speed dubbing of these tracks is executed as follows.

First, high-speed dubbing is inhibited for the three tracks registered in the HCMS control table shown in FIG. 9, namely the tracks Tr1 and Tr2 of the CD-1 and the track Tr1 of the CD-2. To be more specific, the device specification is configured so as to prevent any of these tracks Tr1 and Tr2 of the CD-1 and the Tr1 of the CD-2 for example at least from being high-speed dubbed. Namely, high-speed dubbing is inhibited for any track having the track ID matching the track ID stored in the HCMS control table 44.

For the tracks not registered in the HCMS control table 44 shown in FIG. 9, high-speed dubbing is permitted. These tracks include the tracks recorded on CDs other than the CD-1 and the CD-2 and the tracks other than the Tr1 and Tr2 of the CD-1 and the Tr1 of the CD-2. The dubbing device is configured so that high-speed dubbing can be executed on the tracks for which high-speed dubbing is permitted.

In the HCMS control table 44, when the timer time expires, the corresponding track ID and timer ID are cleared as described above. Consequently, when the timer time has passed, the corresponding track is permitted for high-speed dubbing.

For example, let the control state shown in FIG. 9 be that of current point of time. Then, when about 50 minutes corresponding to the timer time=180 from the current point of time has passed, the registration of the track Tr1 of the CD-1 stored in the area indicated by control number 1 is cleared. Consequently, high-speed dubbing for the track Tr1 of the CD-1 is permitted.

Thus, in the present-embodiment, any track for which high-speed dubbing has been executed once is prevented from another high-speed dubbing operation within the above-mentioned timer time (74 minutes for example). In other words, within a predetermined time corresponding to the timer time, high-speed dubbing is inhibited for any track which has been high-speed dubbed. This prevents copyright from being violated by frequent duplication of a same track in a short time.

In the above example, the track ID is formed by combining the TOC information and a track number recorded on a CD. The track ID may also be formed by use of ISRC described with reference to FIG. 7C. However, because ISRC is information inserted in one track of digital audio data, it is necessary to determine the permission or inhibition of high-speed dubbing after reproducing a track and extracting Q channel data of mode 3 from the reproduced track.

On the contrary, when the track ID is formed by use of the TOC information as shown in FIG. 9, the permission or inhibition of high-speed dubbing can be determined before the track is reproduced from the CD.

For reference, if HCMS control is executed on the basis of ISRC, the time it takes from the start of reproduction of a certain piece of music (a certain track) by the CD player to the detection of ISRC by the system controller 21 is less than one second almost always if it is assumed that ISRC, which is Q channel data of mode 3, is always included once in every 100 sub coding blocks for example. This is because, at single speed, 75 sub coding blocks are generally equivalent to one second. In addition, when HCMS control is executed by use of ISRC, this ISRC itself is used as a track ID, so that, as with the track IDs shown in FIG. 9, the processing of forming a track ID by use of the TOC information recorded on a CD can be omitted. Consequently, the HCMS control based on ISRC may be employed as a sufficiently practical and effective copyright control method.

For a simpler HCMS control method, HCMS control may be executed in unit of a recording medium recording copy source like a CD. To be more specific, HCMS control is executed by relating the disk unique information described with reference to FIG. 9 with timer IDs.

Namely, every time high-speed dubbing is executed, a disk ID consisting only of disk unique information is stored in the track ID column shown in FIG. 9 for example. At the same time, a corresponding timer ID is stored to start the timer specified by the timer ID in the timer block 48.

Then, when high-speed dubbing is to be executed on a certain CD, the disk ID of this CD is matched against the disk IDs stored in the HCMS control table 44. If a matching disk ID is found, the high-speed dubbing is inhibited. Otherwise, the high-speed dubbing is permitted.

In this method, however, HCMS control is made on a disk basis, so that, if only one track Tr1 of a CD has been high-speed dubbed, not only the dubbed track Tr1 but also the subsequent tracks Tr2 and on of the CD are inhibited for high-speed dubbing for 74 minutes after the start of the high-speed dubbing of the track Tr1.

For executing copyright protection in the present embodiment, if the HCMS standard need not be followed especially, the timer time (namely, the time during which high-speed dubbing is inhibited) is not limited to the above-mentioned 74 minutes. A longer or shorter duration of time may be set by considering actual use conditions and copyright protection effects for example.

For example, if the play time of one track is about 3 minutes on average, this play time of 3 minutes may be set as a timer time. The start time of timer counting need not be the start of high-speed dubbing for example. The start time of timer counting may be set to a predetermined timing during the execution of high-speed dubbing. For example, the timer may be started upon the end of high-speed dubbing of a track.

4. High-speed Dubbing Restricting Operation in the Embodiment (at the Time of Reset Operation)

The following describes a high-speed dubbing restricting operation to be executed in response to a reset operation.

The reset operation herein denotes not only the case in which the system is reset (restarted) by a user operation executed on the reset switch 19a but also the case in which the externally supplied power to the power supply block 60 is interrupted for some reason and then resumed later. Namely, the reset operation herein denotes an event which is started after the temporary pause of the power supply to the system controller 21, upon which the system controller 21 is initialized.

Especially, in the present embodiment, a reset operation is regarded as an operation that causes a state in which the HCMS control based on the information (the dubbing track control information) stored in the HCMS control table 44 cannot be continued because the information stored in the RAM 43 shown in FIG. 2 is cleared and therefore the information as the HCMS control table 44 in the RAM 43 is lost.

Figure 10:
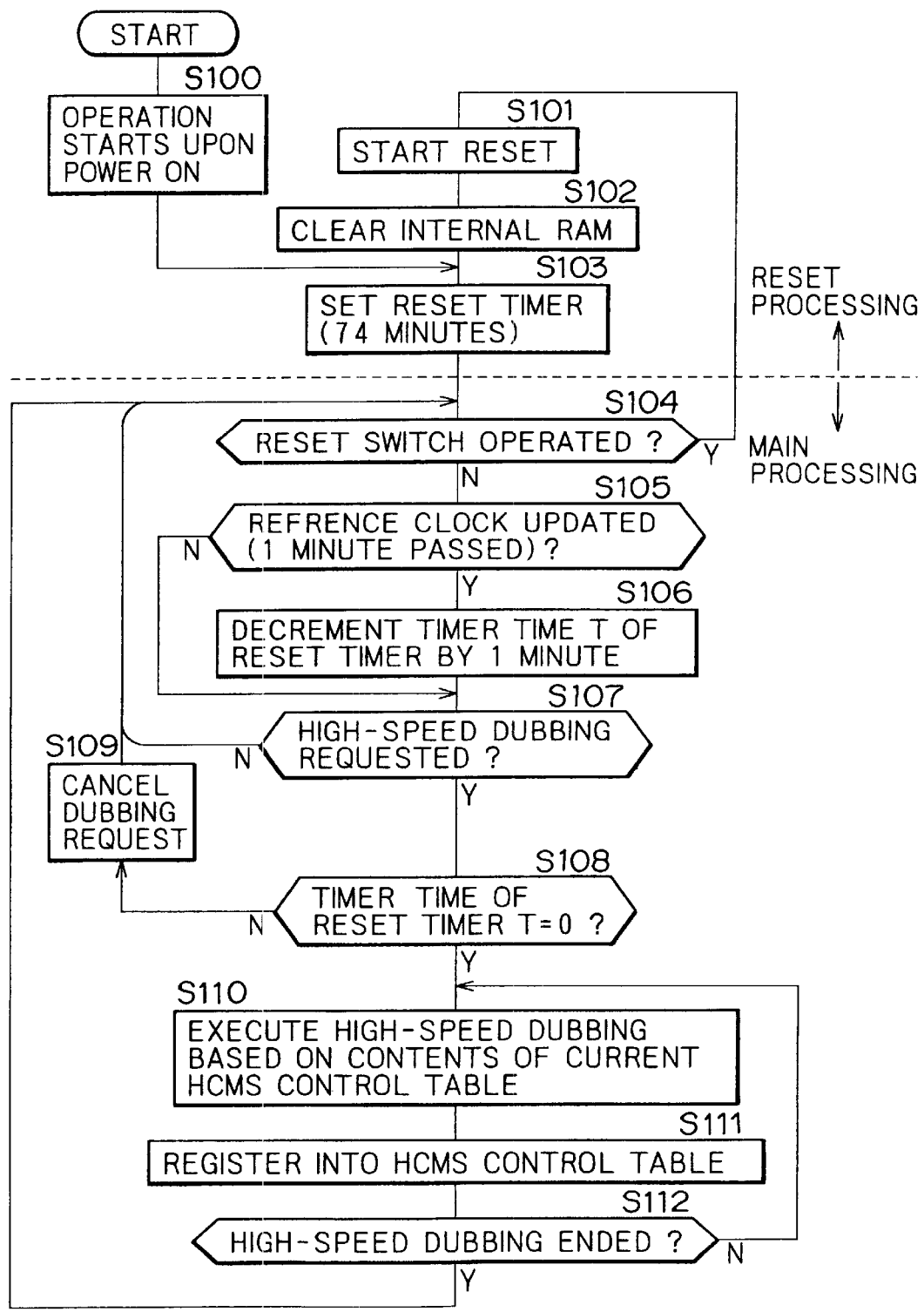
FIG. 10 is a flowchart indicative of processing to be executed when the power to the memory in the present embodiment is reset.

FIG. 10 is a flowchart indicative of the processing operations for realizing a high-speed dubbing restricting operation to be executed in response to a reset operation. It is assumed that these processing operations are executed by the system controller 21.

In a routine shown in FIG. 10, first in step S100, the processing starts upon restarting of the external power supply, interrupted so far, to the power supply block 60, followed by the starting of the system controller 21. At this point of time, the system controller 21 is in the initialized state because the RAM 43 was cleared by the interruption of the external power supply. When the system controller 21 starts operating in this state, the process goes to step S103.

In step S103, the reset timer 47 in the timer block 45 of the system controller 21 is set. It is assumed here that this reset timer is set to 74 minutes in accordance with the HCMS standard. At starting the set operation, a value corresponding to 74 minuets is set, which is subsequently decremented by one minute.

The processes of steps S100 and S103 and the processes of S101 and S102 to be described later are reset processing. Namely, these processes are the processing for the system controller 21 to start its operation from the state in which it is initialized by a reset operation. The processes of steps S104 through S112 constitute main processing, which is executed by the actually restarted system controller 21.

For example, after the execution of the process of step S103, the system controller 21 moves to step S104 to be executed first as the main processing. In step S104, the system controller 21 determines whether the reset switch 19a has been operated or not. If the reset switch 19a is found operated, the system controller 21 goes to step S101 to start a process corresponding to the operation of the reset switch; otherwise, the system controller 21 goes to step S105.

The following describes the processes of step S101 and on to be executed in accordance with the decision of step S104.

Going to step S101, the system controller 21 starts a reset operation in accordance with the operation of the reset switch determined in step S104. In step S104, the power supply at least to the system controller 21 is stopped for example to clear the RAM 43. Next, in step S103, the reset timer 47 is set as described above, upon which the system controller 21 goes to step S104.

Thus, when the reset operation as referred to in the present embodiment, namely the starting of the system controller 21 in response to the resumption of the external power supply and the reset operation in accordance with the reset switch operation, has been executed, the reset timer 47 is set as a part of the reset processing at the starting of the system controller 21. In the main processing to be described below, a high-speed dubbing restricting operation is executed on the basis of the time counted by this reset timer 47.

If the decision is negative in step S104, then the system controller 21 goes to step S105, in which the system controller 21 determines whether the time information counted by the reference clock 46 in the clock block 45 is updated for one minute passed. If the time information is found not updated, the system controller 21 skips step S106 to S107. If the time information is found updated in step S105, the system controller 21 goes to step S106.

In step S106, the system controller 21 decrements timer time T of the reset timer 47 by a value corresponding to one minute, where T is the timer time of the reset timer 47. Namely, in the processes of step S105 and step S106, every one minute of the clocking time by the reference clock 46 passes, the timer time T of the reset timer 47 is decremented by one minute. Then, the system controller 21 goes to step S107.

In step S107, the system controller 21 determines whether a high-speed dubbing request has been made in response to an operation made by the user on the operator block 19 for example to start the execution of high-speed dubbing. If no high-speed dubbing request is found, the system controller returns to step S104. If the high-speed dubbing request is found, the system controller goes to step S108.

In step S108, the system controller 21 determines whether T=0, where T is the current timer time as described above. If 74 minutes have not yet passed after the starting by reset, the decision in this step is no. In this case, the system controller 21 goes to step S109 to cancel the high-speed dubbing request received in step S107. Namely, the system controller 21 does not execute the requested high-speed dubbing operation. Then, the system controller 21 returns to step S104.

Thus, the execution of the processes of steps S108 and S109 via step S104 prevents, during 74 minutes after the starting by reset, the high-speed dubbing operation attempted in response to the operation made by the user to start high-speed dubbing.

If 74 minutes are found already passed from the starting by reset in step S108 and therefore the decision is yes, the system controller 21 can go to steps S110 and on in which the normal HCMS control operation is executed.

In step S110, while executing the normal HCMS control operation on the basis of the contents of the current HCMS control table 44, the system controller 21 execute control so that the high-speed dubbing recording in accordance with the high-speed dubbing request received in step S107 is executed. In step S111, as part of the normal HCMS control operation, the system controller 21 registers each track being high-speed dubbed by the processing of step S110 into the HCMS control table 44 when the high-speed dubbing of each track starts.

The processes of step S110 and step S111 are continued until the end of the high-speed dubbing is determined in step S112. If the decision in step S112 is yes, namely if the target tracks have all been high-speed dubbed, the system controller 21 returns to step S104.

According to the processing configuration shown in FIG. 10, the high-speed dubbing operation itself is inhibited during 74 minutes after the starting by reset, so that high-speed dubbing is also inhibited for a track which is currently enabled for high-speed dubbing. However, if high-speed dubbing is attempted on a track which was being high-speed dubbed before the reset and the time (74 minutes) in accordance with the HCMS standard has not passed to permit high-speed dubbing, this track cannot be high-speed dubbed.

Figure 11:
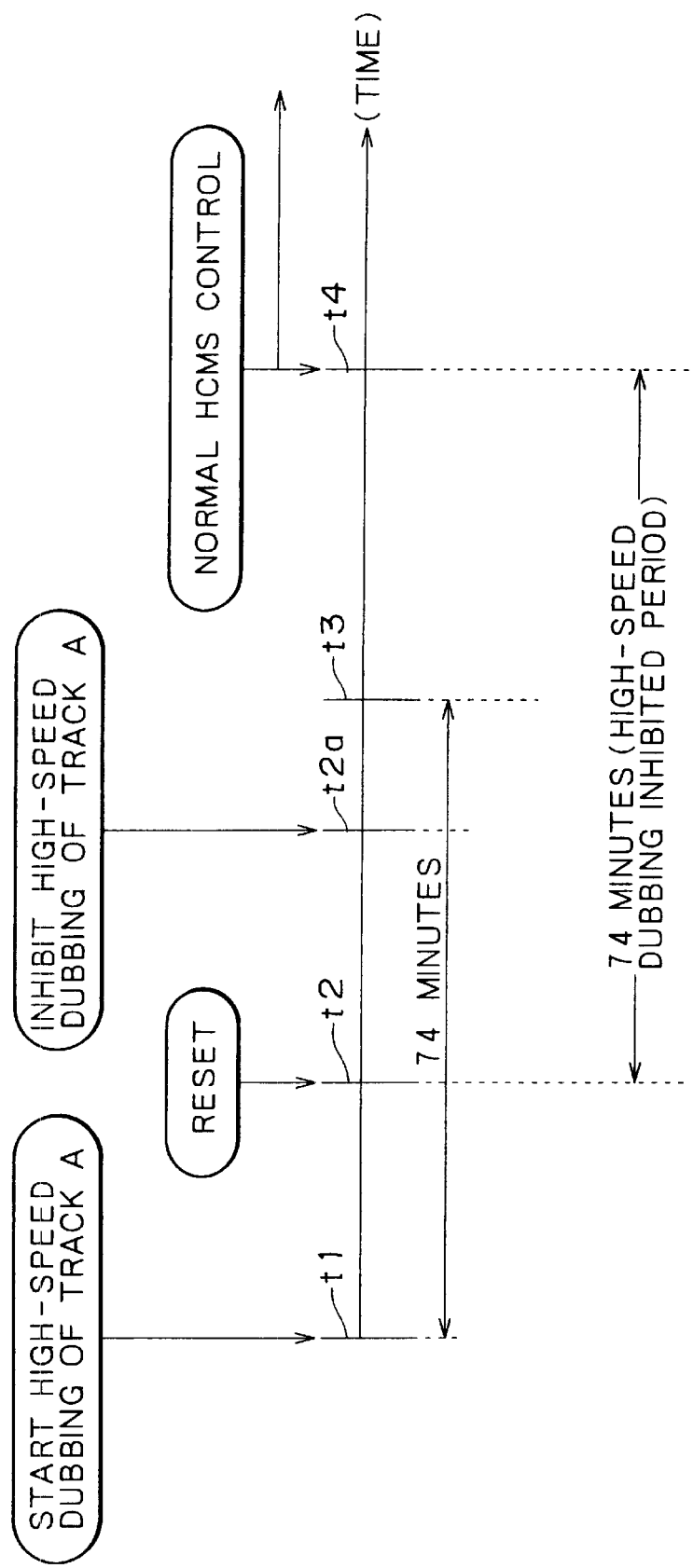
FIG. 11 is a timing chart indicative of a case in which the power to the memory in the present embodiment is reset.

Referring to FIG. 11, there is shown a specific example.

In FIG. 11, it is assumed that high-speed dubbing of track A recorded on a CD starts at time t1. Therefore, track A is controlled on the HCMS control table 44 as one that is disabled for high-speed dubbing for 74 minutes after time t1. Namely, high-speed dubbing is inhibited for this track until time t3 shown in FIG. 11.

It is assumed that a reset operation is made by operating the reset switch 19a at time t2 which is near to time t1 but at which 74 minutes have not passed.

Because the contents so far stored in the HCMS control table 44 are cleared when the reset operation is made, an HCMS control operation similar to the normal HCMS control operation in which track A is disabled for high-speed dubbing until time t3 is strictly reached and enabled for high-speed dubbing thereafter cannot be executed.

However, the execution of the processes of step S104 through step S108 shown in FIG. 10 inhibits the high-speed dubbing operation itself between time t2 at which the reset operation was made and time t4 at which 74 minutes pass. If a high-speed dubbing request is made after time t4, high-speed dubbing is permitted by the HCMS control operation similar to the normal HCMS control operation.

It is assumed here that, after resetting at time t2, high-speed dubbing is attempted on track A at time T2a which is before time t3 at which the high-speed dubbing of track A should be inhibited by the HCMS standard. However, this high-speed dubbing on track A cannot be executed because the high-speed dubbing itself is inhibited at time T2a.

As seen from FIG. 11, any high-speed dubbing is inhibited during 74 minutes after the starting by reset. Consequently, for example, if a track is high-speed dubbed, reset is made after comparatively immediately thereafter, and then high-speed dubbing is attempted on the same track, such an attempt fails. Thus, in the present embodiment, even if reset is made to clear the contents of the HCMS control table stored in the RAM 43, high-speed dubbing can be restricted in accordance with the HCMS standard.

As described, the HCMS control operation, namely the high-speed dubbing restricting operation, to be executed against the reset operation according to the present embodiment is simple in principles of operation. However, this method is especially effective when the cost of the dubbing device need be minimized because this method requires no such devices as EEP-ROM or auxiliary power supply as described with reference to the related art technology.

In the above description, the time counting for inhibiting high-speed dubbing starts when the dubbing device is restarted by reset. However, if an external power is supplied again for example as a reset operation, the period until the external power is supplied again after the clearing of the contents of the RAM due to the interruption of the external power supply may be as long as several minutes to several tens of minutes for example. In the case of the reset where the period from the clearing of the contents of the RAM to the restarting of the dubbing system is long, the time counting for restricting high-speed dubbing in response to a reset operation may be started at the time when the contents of the RAM are cleared (for example, the time at which the external power supply was stopped).

The above-mentioned novel configurations have been described on condition that there are inhibiting rules associated with high-speed dubbing.

However, in consideration of possible future copyright protection rules or if copyright protection is to be executed without being ruled by the HCMS standard, normal, single-speed dubbing should also be restricted.

For example, a copy management system is possible in which any track as a piece of music once dubbed is disabled for another dubbing operation for at least 74 minutes after the start of the last dubbing regardless of dubbing speed.

The above-mentioned embodiment is also applicable to such a copy management system. Namely, not only high-speed dubbing but also single-speed dubbing that is slower than the high-speed dubbing is inhibited for a predetermined duration of time after the dubbing system is restarted by a reset operation.

The present invention is not limited to the configurations described above.

For example, for the above-mentioned embodiment, the dubbing device in which the MD recorder/player for driving a recording medium of dubbing destination is integrated with a CD player for driving a recording medium of dubbing source. The present invention is also applicable to any system in which a recording device for a dubbing destination recording medium and a reproducing device for dubbing source recording medium are separately arranged.

The present invention is also applicable to not only dubbing systems having a plurality of MD recorders/players but also such dubbing systems having a recording/reproducing device adapted to tape media as DATs and a tape cassette recorders.

As long as the control by the copy management system is practicable, recording sources for dubbing recording are not limited to the audio data reproduced from recording media. For example, the recording source may in the future include the audio data received by a radio tuner or a digital satellite tuner.

It should be noted that, in FIG. 4, the timer is decremented and when zero is reached, the high-speed dubbing operation is permitted. It will be apparent to those skilled in the art that the timer may be incremented from zero and, when 74 minutes for example passes, the high-speed dubbing operation is permitted.

As described and according to the invention, the dubbing apparatus described above, if restarted by forcible reset by user operation or resumption of external power, inhibits high-speed dubbing itself until a predetermined duration of time passes after the restart. This prevents unauthorized high-speed dubbing of any track that was high-speed dubbed before the reset operation and therefore its high-speed dubbing should be inhibited during the predetermine duration of time after the reset operation.

Namely, the present invention can normally carry out high-speed dubbing control if the dubbing track control information stored in a memory element such as RAM is cleared and lost at the time of reset.

For this purpose, the information (namely dubbing track control information) for high-speed dubbing control is stored in a RAM incorporated in a microcomputer (or a system controller) for example of the dubbing apparatus. Namely, the arrangement of one microcomputer can realize proper high-speed dubbing restricting operations. Consequently, the dubbing apparatus according to the invention need not additionally arrange an EEP-ROM for example or an auxiliary power supply for the RAM in order to avoid the loss of the dubbing track control information due to reset, thereby saving the cost of dubbing control.

While the preferred embodiments of the present invention have been described using specific terms, such description is for illustrative purposes only, and it is to be understood that changes and variations may be made without departing from the spirit or scope of the appended claims.

What is claimed is:

1. A dubbing system for dubbing at least one of programs from a first recording medium in a reproducing unit to a second recording medium in a recording unit, comprising:

operating means for selecting one of high-speed dubbing and normal-speed dubbing that is to be performed on a predetermined program recorded on said first recording medium;

clocking means for executing a clocking operation;

clock control means for starting said clocking operation by said clocking means when said predetermined program is high-speed dubbed from said first recording medium to said second recording medium;

storage means for storing clock information of said clocking means in correspondence to each program recorded on said first recording medium;

power supply means for supplying a power at least to said storage means;

detecting means for detecting whether the power from said power supply means to said storage means has been interrupted; and control means for controlling, when selecting by said operating means high-speed dubbing of said predetermined program recorded on said first recording means to said second recording means, permission or inhibition of the high-speed dubbing with reference to said clock information stored in said storage means corresponding to said predetermined program recorded on said first recording means, and, when an interruption of the power supply from said power supply means to said storage means is detected by said detecting means and then the power supply to said storage means is restarted, inhibiting the high-speed dubbing of all programs recorded on said first recording means until a predetermined duration of time passes.

2. A dubbing system according to claim 1, wherein said storage means is a volatile memory.

3. A dubbing system according to claim 1, further comprising:

comparing means for comparing said clock information stored in said storage means corresponding to said predetermined program recorded on said first recording medium with a predetermined time;

wherein, when selecting by said operating means the high-speed dubbing of said predetermined program recorded on said first recording medium to said second recording medium, if the clock information corresponding to said predetermined program recorded on said first recording medium is found equal to or longer than the predetermined time, said control means permits the high-speed dubbing.

4. A dubbing system according to claim 1, further comprising comparing means for comparing said clock information stored in said storage means corresponding to said predetermined program recorded on said first recording medium with a predetermined time;

wherein, when selecting by said operating means the high-speed dubbing of said predetermined program recorded on said first recording means to said second recording means, if the clock information corresponding to said predetermined program recorded on said first recording medium is found shorter than the predetermined time, said control means inhibits the high-speed dubbing.

5. A dubbing system according to claim 1, further comprising comparing means for comparing the clock information stored in said storage means corresponding to said predetermined program recorded on said first recording means with a predetermined time;

wherein, when selecting by said operating means the high-speed dubbing of said predetermined program recorded on said first recording means to said second recording means, if the clock information corresponding to said predetermined program recorded on said first recording medium is equal to or longer than the predetermined time, said control means inhibits the high-speed dubbing.

6. A dubbing system according to claim 1, further comprising comparing means for comparing said clock information stored in said storage means corresponding to said predetermined program recorded on said first recording medium with a predetermined time;

wherein, when selecting by said operating means the high-speed dubbing of said predetermined program recorded on said first recording means to said second recording means, if the clock information corresponding to said predetermined program recorded on said first recording medium is found shorter than the predetermined time, said control means permits the high-speed dubbing.

7. A dubbing system according to claim 1, wherein the predetermined time by which the high-speed dubbing is inhibited is equal to a maximum recording time of said first recording medium.

8. A dubbing method for storing log information in a memory indicative of whether a high-speed dubbing operation was executed within a predetermined length of time when selecting a high-speed dubbing operation for a program recorded on a first recording medium to a second recording medium and inhibiting a next high-speed dubbing operation within a predetermined length of time after the last high-speed dubbing operation, said dubbing method comprising the steps of:

determining whether a power supply to said memory has been interrupted;

if, the power supply to said memory is found interrupted, starting a clocking operation; and on the basis of a result of said clocking operation, inhibiting said high-speed dubbing operation for said program recorded on said first recording medium to said second recording medium until said predetermined length of time passes.

9. A dubbing method according to claim 8, wherein said memory is a volatile memory.

10. A dubbing method according to claim 8, wherein said predetermined length of time in which said high-speed dubbing operation is inhibited is equal to a maximum recording time of said first recording medium.

* * * * *